United States Patent [19]

Kaite et al.

[11] Patent Number: 5,589,755
[45] Date of Patent: Dec. 31, 1996

[54] METHOD AND APPARATUS FOR CHARGING A SECONDARY BATTERY

[75] Inventors: Osamu Kaite; Tatsuya Okada; Toshiharu Kokuga, all of Hyogo, Japan

[73] Assignee: Sanyo Electric Co., Ltd., Osaka, Japan

[21] Appl. No.: 392,658

[22] Filed: Feb. 23, 1995

[30] Foreign Application Priority Data

Feb. 24, 1994 [JP] Japan .................... 6-026623

[51] Int. Cl.$^6$ .................... H01M 10/44; H01M 10/46
[52] U.S. Cl. .................... 320/21; 320/23; 320/39
[58] Field of Search .................... 320/19, 21, 22, 320/23, 39

[56] References Cited

U.S. PATENT DOCUMENTS

| | | | |
|---|---|---|---|
| 5,028,860 | 7/1991 | Amano | 320/23 |
| 5,172,044 | 12/1992 | Sasaki | 320/22 |
| 5,179,335 | 1/1993 | Nor | 320/21 |
| 5,408,170 | 4/1995 | Umetsu et al. | 320/39 |
| 5,442,274 | 8/1995 | Tamai | 320/23 |

FOREIGN PATENT DOCUMENTS

3253232  11/1991  Japan .

Primary Examiner—Peter S. Wong
Assistant Examiner—Patrick B. Law
Attorney, Agent, or Firm— Loeb & Loeb LLP

[57] ABSTRACT

A secondary battery is charged with a constant voltage, while a charging current generated by the application of the constant voltage is monitored. After the charging current becomes smaller than a predetermined current value, an open circuit voltage of the secondary battery is sampled at a predetermined interval while substantially stopping charging. Charging is completed, when either a voltage difference between a terminal voltage of the secondary battery and the sampled open circuit voltage becomes smaller than a predetermined voltage difference value, the sampled open circuit voltage becomes bigger than a predetermined voltage value, or, a remaining charging time of a timer which is calculated based on the sampled open circuit voltage has elapsed. The method shortens the charging time and enables the correct detection of the fully charged state.

17 Claims, 11 Drawing Sheets

| THE AMOUNT OF CHARGE \ LED NUMBER | ① | ② | ③ |
|---|---|---|---|
| 0 - 20 % | ☆ | ● | ● |
| 20 - 60 % | ○ | ● | ● |
| 60 - 90 % | ○ | ○ | ● |
| MORE THAN 90 % | ○ | ○ | ☆ |
| THE COMPLETION | ○ | ○ | ○ |
| MORE THAN 1 HOUR AFTER THE COMPLETION | ● | ● | ● |

☆ : BLINKING  
○ : TURNED ON  
● : TURNED OFF

METHOD AND APPARATUS FOR CHARGING A SECONDARY BATTERY

FIELD OF THE INVENTION

The present invention relates generally to the charging of a secondary battery, and also to detecting the fully charged state of a secondary battery.

BACKGROUND OF THE INVENTION

A secondary battery is a battery that can be repetitively recharged. The charging characteristics of a secondary battery including the behavior of the battery terminal voltage as charging progresses often depends upon the type of the secondary battery. For example, a nickel-cadmium battery has charging characteristics in which the terminal voltage of the secondary battery typically peaks when the battery is fully charged. On the other hand, nonaqueous secondary batteries, such as, for example, a nonaqueous, organic electrolyte, lithium secondary battery (hereinafter referred to as a lithium ion secondary battery), usually does not exhibit a peak of the terminal voltage. Instead, the terminal voltage usually continues to increase as the battery is overcharged. The latter charging characteristics of nonaqueous secondary batteries can make detection of the fully charged state more difficult.

In addition, when secondary batteries of any type are overcharged, the properties of the secondary batteries are usually deteriorated. For example, the life span of the secondary battery is typically decreased by an overcharge. A lithium ion secondary battery is particularly susceptible to weakening as a result of excessive charging.

To prevent the lithium ion secondary battery from being overcharged to an excessively high voltage, U.S. Pat. No. 5,028,860 describes a method of charging using a constant voltage. When the lithium ion secondary battery is charged with a constant voltage, the charging current typically decreases, as the charging progresses to the full charge level. Accordingly, the charging current may be monitored, and when the charging current becomes smaller than a predetermined current value, the charging current can be shut off. However, it is often difficult to determine the appropriate current value at which to terminate the charging current. For example, in order to fully charge a lithium ion secondary battery, it is usually necessary to set the predetermined current value to a small value. However, when the lithium ion secondary battery becomes degraded or is charged at a low ambient temperature, the charging current often does not become sufficiently small even after the battery is fully charged. Therefore, if the predetermined current value is set to too small of a value, the charging current may not ever reach the predetermined current value under a variety of circumstances such that charging may not be properly terminated.

Figure 1:
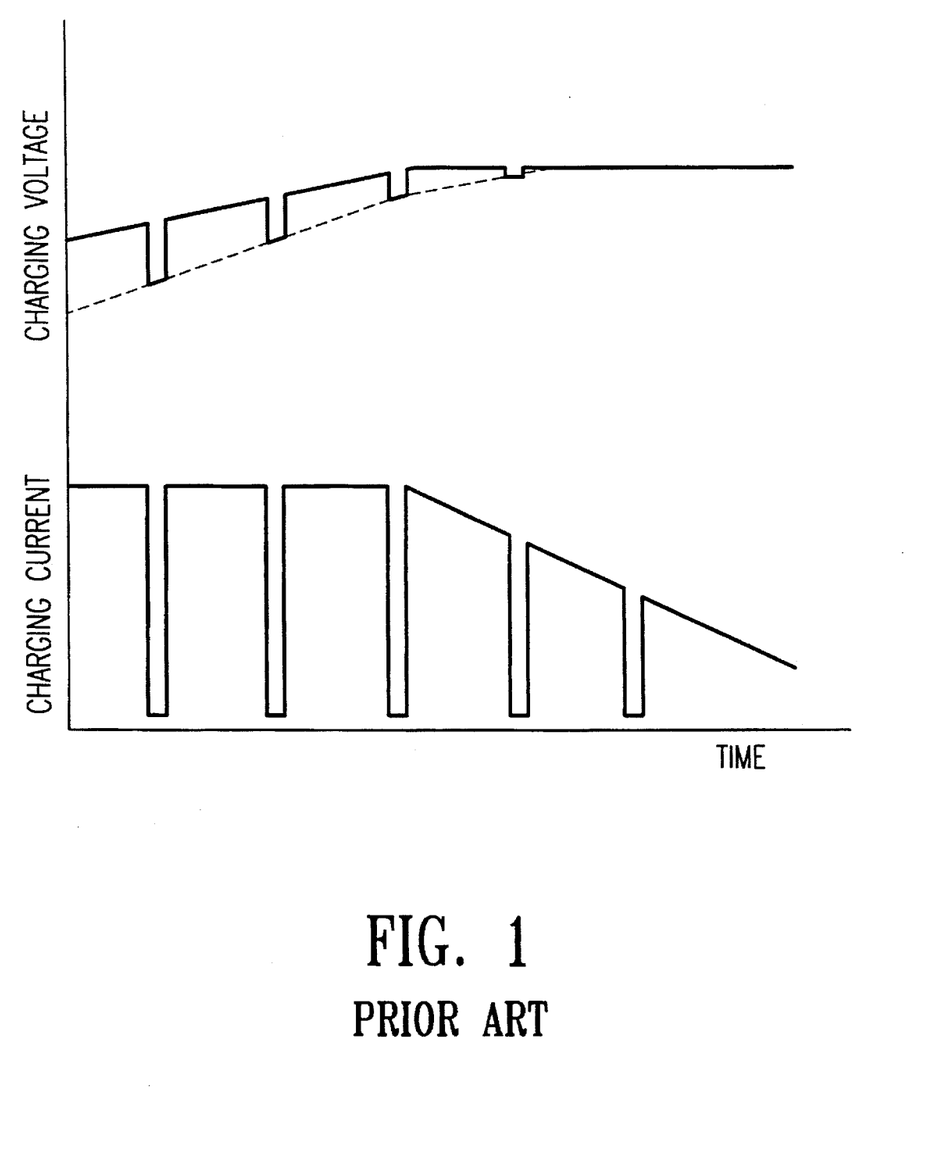
FIG. 1 is a graph showing the charging characteristics of a prior art charging in which an open circuit voltage is sampled to detect a fully charged state.

Japanese Patent Laid-open No. HEI 3-253232 describes a charging method in which the terminal voltage of the secondary battery being charged is monitored to detect the fully charged state. As shown in FIG. 1, soon after the charging process is started, the charging current is reduced during a predetermined interval to a small charging current value (approximately zero charging current) which is substantially smaller than the normal charging current value. During this interval, the terminal voltage is approximately the same as the open circuit voltage which provides a good indication of the charge level of the battery. On the other hand, when the terminal voltage is monitored during the normal charging current, the monitored terminal voltage is usually much larger than the open circuit voltage because of a voltage drop caused by contact resistance or by an internal resistance within the secondary battery.

The method described in HEI 3-253232 reference facilitates the correct detection of the fully charged state. However, this method can increase the time necessary to fully charge the secondary battery, because the secondary battery is charged with a small charging current during the predetermined interval following the initiation of charging.

THE SUMMARY OF THE INVENTION

It is an object of the present invention to provide a method of charging a secondary battery which reduces charging time and improves the detection of the fully charged state to prevent the secondary battery from being overcharged.

These and other objects are achieved by a method of charging, in accordance with one embodiment of the present invention, which comprises the steps of: charging a secondary battery at a constant voltage; after the charging current becomes smaller than a predetermined current value, sampling the open circuit voltage of the secondary battery during a predetermined interval in which charging is substantially stopped, and thereafter controlling subsequent charging according to the sampled open circuit voltage.

In accordance with embodiments of the present invention, the open circuit voltage is detected at a predetermined interval only after the charging current becomes smaller than a predetermined current value. In other words, while the charging current is high, charging is not stopped to monitor the open circuit voltage. Accordingly, the time required for charging is reduced. However, after the charging current becomes smaller than a predetermined current value, the open circuit voltage is sampled to detect the fully charged state.

DETAILED DESCRIPTION OF THE PREFERRED EMBODIMENTS

An embodiment of the present invention is described with reference to FIGS. 2–11. As will be explained in greater detail below, the fully charged state of a secondary battery is detected by periodically sampling the open circuit voltage of the secondary battery while the charging is stopped, but preferably only after the charging current becomes smaller than a predetermined current value. Such a method permits fully charging the battery in a relatively short time and also permits precise detection of the fully charge state.

Figure 3:
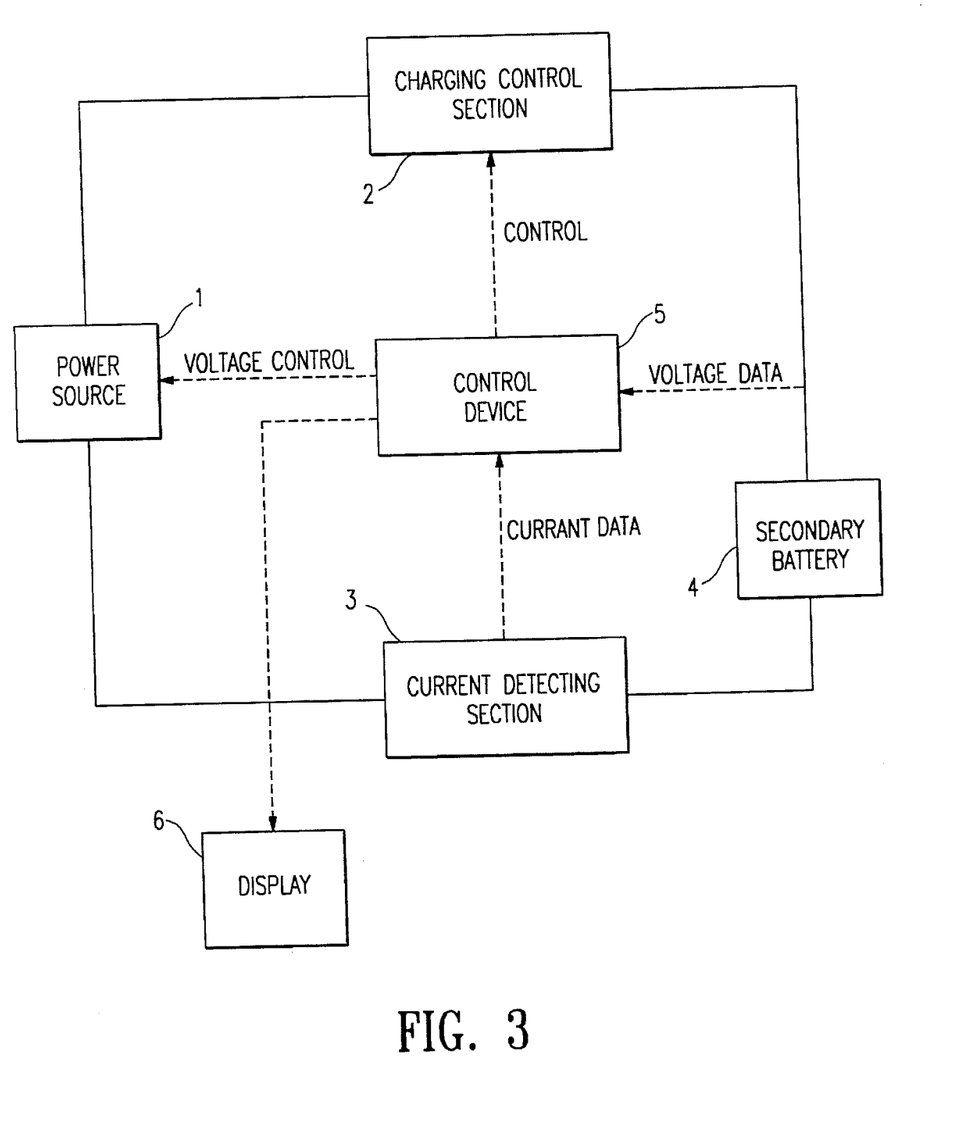
FIG. 3 is a block diagram of a charging apparatus in accordance with an embodiment of the present invention.

FIG. 3 shows a block diagram of a charging apparatus in accordance with a preferred embodiment. There, a nonaqueous, organic electrolyte, lithium secondary battery (hereinafter referred to as a lithium ion secondary battery) is used as the secondary battery. However, the present invention is useful with any of a number of different types of secondary batteries. The apparatus comprises a current detecting section 3 which detects the charging current and outputs data in response to the charging current. A charging control section 2 is connected between the power source 1 and the secondary battery 4. A control device 5 monitors the terminal voltage of the secondary battery 4 and also monitors the data from the current detecting section 3. In response, the control device 5 controls the charging control section 2 and the power source 1. A display 6 coupled to the output of the control device 5 displays charging conditions.

The power source 1 converts alternating current to a direct current, and changes the direct current to a high frequency alternating current of a desired voltage. The high frequency alternating current is rectified into a smooth DC (direct current) voltage. The power source 1 preferably first charges the secondary battery 4 with a constant current until the terminal voltage of the secondary battery 4 reaches a predetermined voltage value, and then charges the second battery 4 with a constant voltage.

The charging control section 2 includes a switching element (not shown), such as, for example, a transistor, such as a FET. The switching element controls the charging current of the secondary battery 4 in response to a signal from the control device 5. In one embodiment, when the switching element is ON, the secondary battery 4 is connected to the power source 1 and is charged. When the switching element is OFF, the secondary battery 4 is disconnected from the power source 1 and charging is stopped. When the switching element is OFF, the terminal voltage (Voff) is monitored.

The charging controlling section 2 may have a current limiting resistance (not shown) which is connected in parallel with the switching element. As a result, when the switching element is OFF and high level charging is stopped, the power source 1 is connected through the current limiting resistance to the secondary battery 4. As a consequence, the secondary battery 4 is charged at a very low charging current (hereinafter referred to as the trickle charging current). The trickle charging current is set at a low level which is substantially lower than the rated charging current, for example, less than one tenth of the rated charging current. In a preferred embodiment, when the rated charging current is 2 A, the trickle charging current is set at under 200 mA, more preferably about 100 mA. The charging controlling section 2 including the current limiting resistance in parallel with the switching element, preferably has a main switch (not shown) which shuts off the charging current when the secondary battery 4 is fully charged. The main switch is preferably connected in series with the switching element and the current limiting resistance.

The current detecting section 3 monitors the charging current, and converts analog data representative of the charging current into digital data, and sends the digital data to the control device 5. More specifically, the current detecting section 3 preferably comprises a current detecting resistance, an amplifier and an A/D converter (not shown). The current detecting resistance is connected in series with the secondary battery 4. The amplifier amplifies the voltage across the current detecting resistance. The A/D converter converts analog data from the amplifier into digital data. The digital data is sent to the control device 5.

The control device 5 is preferably a microcomputer (CPU) (not shown), and receives digital data from the current detecting section 3. The control device 5 also receives analog data representative of the terminal voltage of the secondary battery 4, and has an A/D converter (not shown) which converts the analog data of the terminal voltage into digital data. The control device 5 controls the power source 1 and the charging control section 2 in the following manner. At the beginning of charging, the secondary battery 4 is preferably charged with a constant current. During this time, the terminal voltage is monitored, and, when the terminal voltage becomes higher than a predetermined voltage value, the secondary battery 4 is charged with a constant voltage instead of the constant current. The above charging method enables the secondary battery 4 to be fully charged in a shorter charging time.

Figure 2:
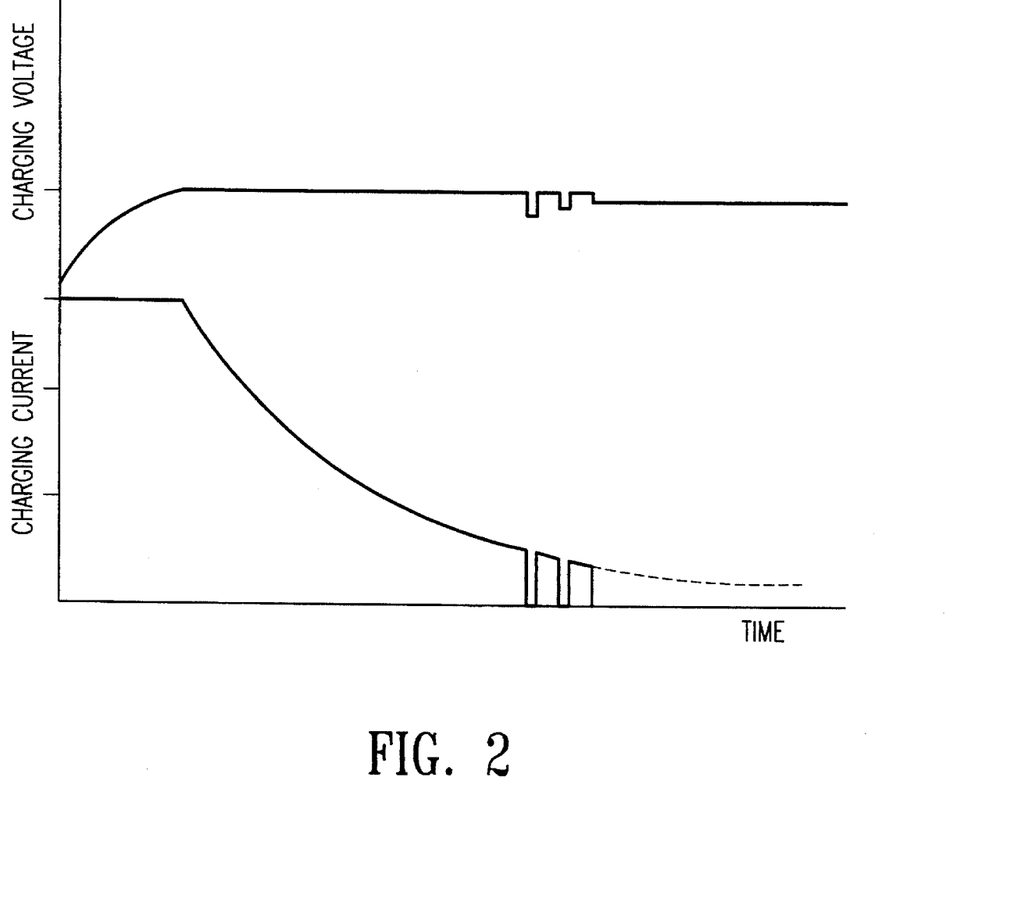
FIG. 2 is a graph showing charging characteristics in accordance with an embodiment of the present invention.

In a preferred embodiment, the secondary battery 4 comprises a lithium ion secondary battery. FIG. 2 shows charging characteristics of the lithium ion secondary battery when charged by the above method. At the beginning of charging, the lithium ion secondary battery 4 is charged with a predetermined constant current value (for example, 3.0 A) and the terminal voltage of the secondary battery 4 is monitored. When the terminal voltage becomes higher than a predetermined reference value (for example, 4.1 V), the lithium ion secondary battery 4 is charged with a constant voltage instead of the constant current. At this stage the charging current is monitored instead of the terminal voltage. After the charging current becomes smaller than a predetermined current value (for example, 0.7 A), high level charging is stopped for a predetermined interval. While the high level charging is stopped, the apparatus samples the open circuit voltage (Voff) of the lithium ion secondary battery 4. Utilizing the sampled open circuit voltage (Voff), the apparatus may detect the fully charged state in a variety of manners including the following three approaches.

In a first embodiment which will be discussed below, the apparatus detects a full charge when the difference between the sampled open circuit voltage (Voff) and the sampled terminal voltage (Von) becomes equal to or less than a predetermined voltage difference value (for example, 40 mV).

In a second embodiment which will be discussed below, the apparatus detects a fully charged state when the sampled open circuit voltage (Voff) becomes equal to or more than a predetermined voltage reference value (for example, Vref= 4.06 V).

In a third embodiment which will be discussed below, the apparatus detects a fully charged state upon expiration of a timed remaining charging period which is calculated based on the sampled open circuit voltage (Voff).

In FIG. 2, the dashed line represents the charging characteristics of the lithium ion secondary battery being charged with only a constant voltage at the fully charged stage. At this stage, the charging current gradually approaches to a stable, low level value during the final stage. As mentioned above, in one prior art method which detects the fully charged state at the point at which the charging current becomes smaller than a predetermined value, it is often difficult to select the appropriate predetermined current value. This is particularly true when the secondary battery is degraded or the secondary battery is charged at a low ambient temperature because the charging current often does not become sufficiently small even at the fully charged state.

However, in the above embodiment in accordance with the present invention, after the charging current becomes smaller than a predetermined current value which is preferably higher than the stable, low level of charging current, the apparatus samples the open circuit voltage to detect the fully charged state. Because the predetermined current value is relatively high, the apparatus can readily detect the predetermined current value, to permit the apparatus to complete the charging based on the sampled open circuit voltage.

It is appreciated that in various embodiments, the interruption of charging includes not only situations where the charging current is completely shut off, but also where the charging current is set to a low current (for example, equal to or less than one tenth of a rated charging current). The open circuit voltage (Voff) can be sufficiently accurately sampled while the charging is interrupted because of the absence or substantial reduction in the voltage drop caused by the charging current which flows through contact resistances and an internal resistance of the secondary battery.

The method of charging the secondary battery with a constant voltage has several advantages. For example, the secondary battery is prevented from being overcharged and having an overvoltage. However, a charging method using only a constant voltage usually takes longer time than a charging method using only a constant current. In accordance with the present invention, at the beginning of charging, the secondary battery is initially charged by a constant current. After the terminal voltage becomes higher than a predetermined voltage value, the secondary battery is then charged by a constant voltage instead of a constant current. As a result, the secondary battery 4 is fully charged in a relatively short charging time without overcharging the battery.

Figure 4:
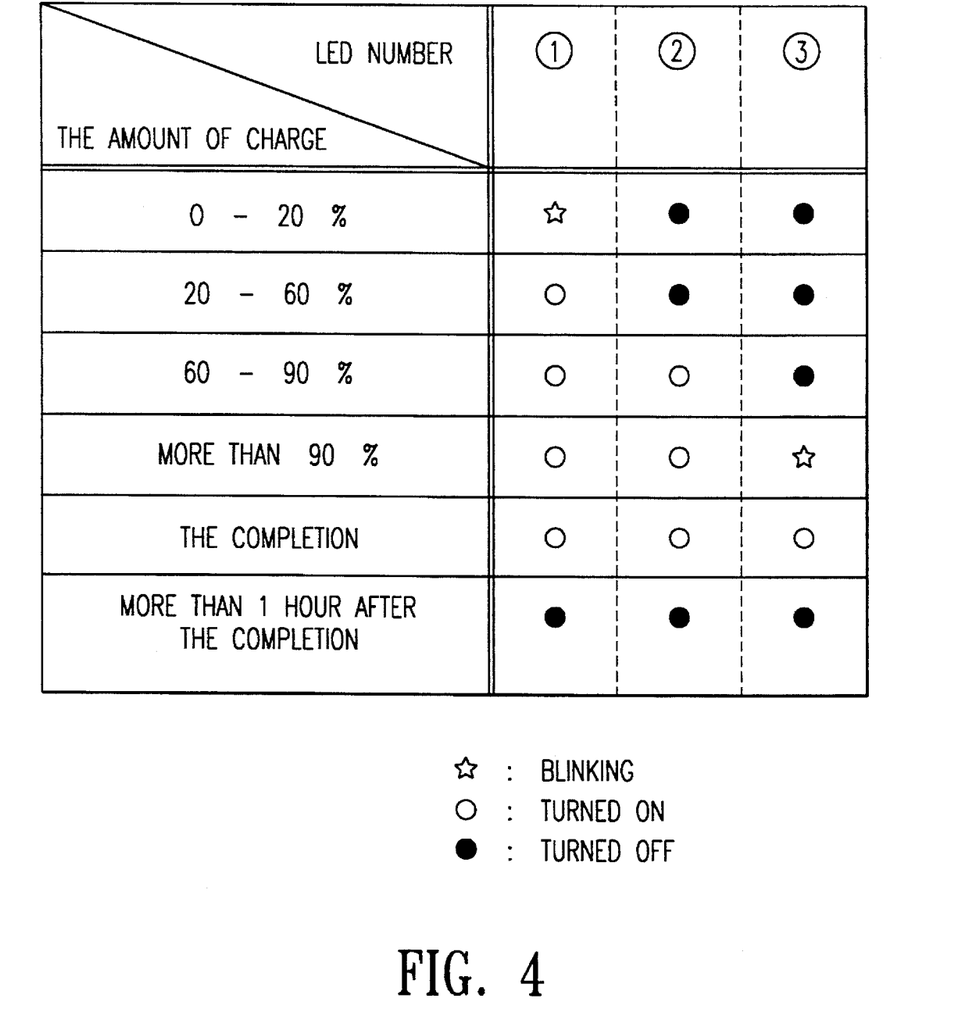
FIG. 4 is a chart showing charging conditions which are indicated by LED's.

As shown in FIG. 4, the amount of charge of the secondary battery 4 is indicated by LED's No. 1, No. 2 and No. 3 of the display 6. For example, when the secondary battery 4 is charged by 0–20%, the LED No. 1 blinks while the LED's No. 2 and No. 3 are turned off.

Figure 6:
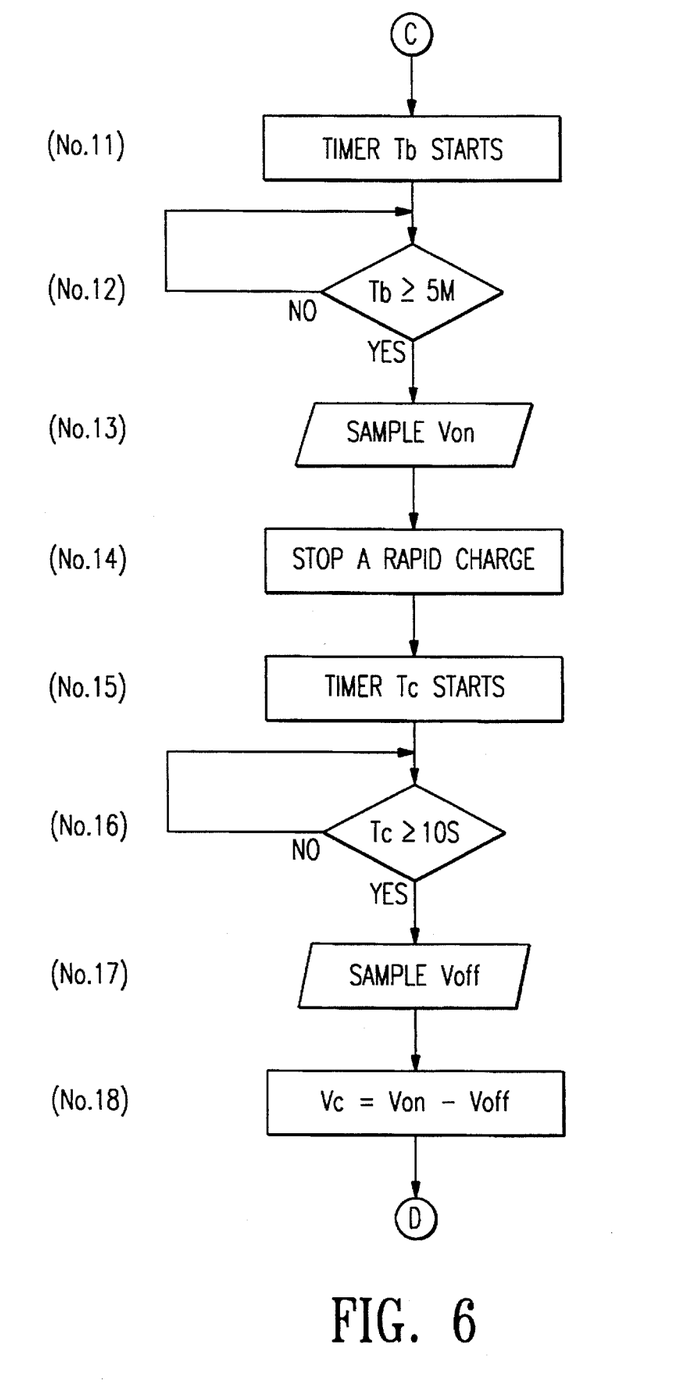
FIGS. 6 and 7 are flow charts showing a method of charging the secondary battery in accordance with a first embodiment of the present invention.
Figure 7:
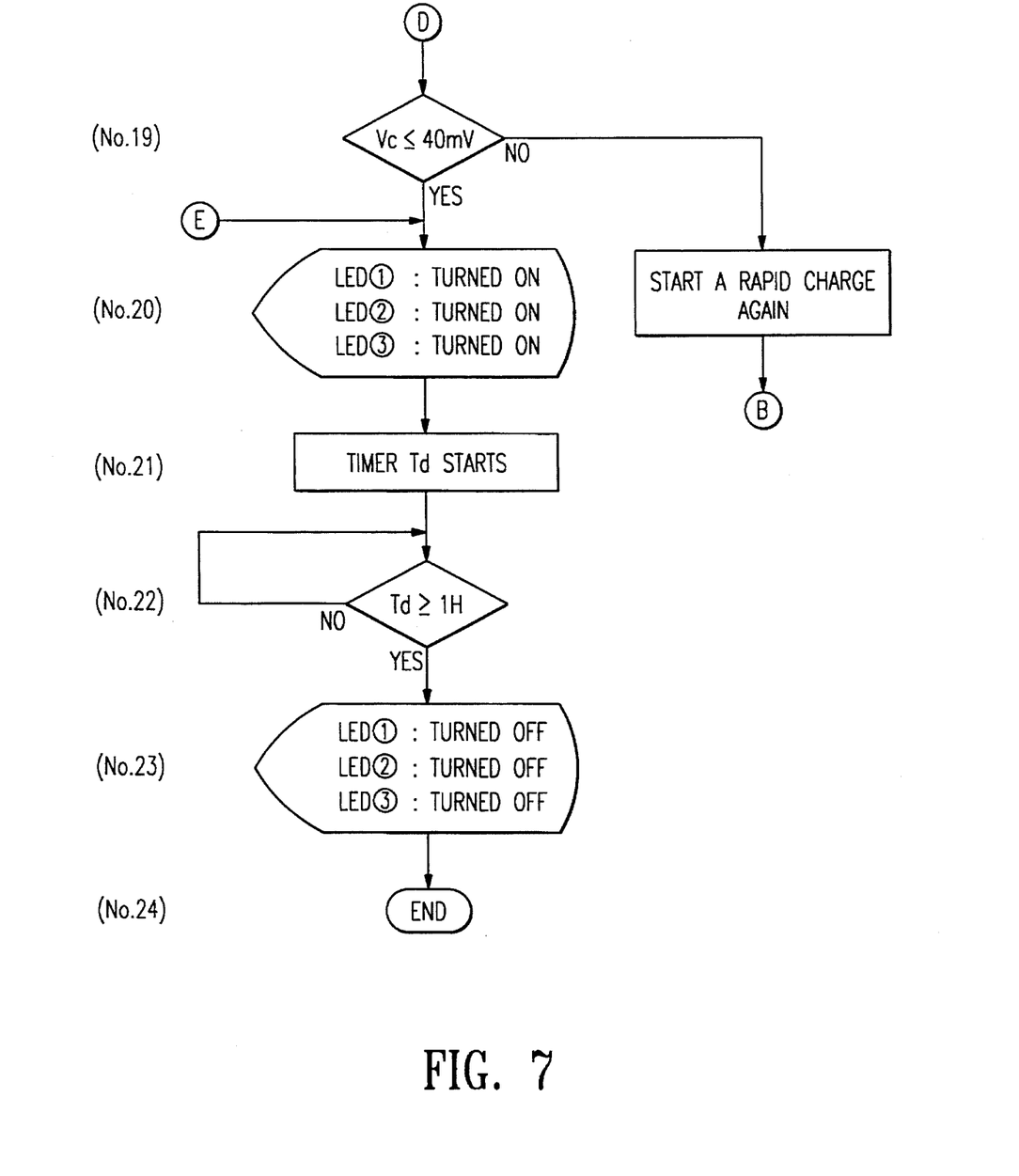

The charging method in accordance with the first embodiment will be described below with reference to flow charts shown in FIGS. 5–7. In step No. 1, the apparatus determines whether the secondary battery 4 is set. A determination is then made in step No. 2 as to whether the performance of the secondary battery 4 is proper. In step No. 2, the apparatus will stop charging, for example, if the set secondary battery has an internal short.

If the battery performance is proper, the apparatus starts a rapid charge in step No. 3. At the beginning of charging, the secondary battery 4 is charged with a predetermined constant current value (for example, 3.0 A) and the terminal voltage of the secondary battery 4 is monitored. When the terminal voltage becomes higher than a predetermined voltage value (for example, 4.1 V), the secondary battery 4 is charged by a constant voltage (for example, 4.1 V) instead of the constant current. At the same time when the charging is started, the apparatus starts a protective timer which is installed inside the control device 5. If the apparatus does not detect a fully charged state within a predetermined time period (Ta) as measured by the protective timer, the apparatus will terminate the charging. The predetermined time (Ta) of the protective timer is preferably set to 3–4 hours in the illustrated embodiment. In step No. 4, the LED No. 1 is set to blinking, and the LED's No. 2 and No. 3 are turned off.

A determination is made in step No. 5 as to whether the predetermined time period (Ta) has elapsed. If the predetermined time period (Ta) has elapsed, the process proceeds to step No. 20.

If the predetermined time period (Ta) has not elapsed and after the rapid constant current charge has switched to a constant voltage charge, the control device 5 samples a charging current I at a predetermined constant interval. Then in step No. 6, a determination is made as to whether the sampled charging current I is 1) more than 2 A, 2) more than 1.4 A and not more than 2 A, or 3) not more than 1.4 A. If the charging current I is more than 2 A, the process proceeds to step No. 4. If the charging current I is more than 1.4 A and not more than 2 A, the process proceeds to step No. 7, and the LED No. 1 is turned on, and the LED's No. 2 and 3 remain turned off. If the charging current I is not more than 1.4 A, the process proceeds to step No. 8 where the LED's No. 1 and 2 are turned on, and the LED No. 3 remains turned off.

In step No. 9, the control device 5 samples the charging current I, and determines whether the sampled charging current I is 1) more than 0.7 A, or 2) is equal to or less than 0.7 A. If the charging current I is more than 0.7 A, the process goes back to step No. 5. If the charging current I is equal to or less than 0.7 A, the LED's No. 1 and 2 remain turned on, and the LED No. 3 starts blinking.

In step No. 11, the apparatus starts a timer Tb having a predetermined time period of 5 minutes. If a determination is made in step No. 12 that the predetermined time of 5 minutes has elapsed, the apparatus samples the terminal voltage of the secondary battery 4 in step No. 13. At this time, the secondary battery 4 is being charged with a constant voltage, therefore the sampled voltage is equal to the constant voltage (Von).

In step No. 14, the control device 5 stops the rapid charge, by turning off the switching element of the charging control section 2. In step No. 15, the control device 5 starts a timer Tc having a predetermined time of 10 seconds. A determination is made in step No. 16 as to whether the condition Tc≧10 seconds is met. During the predetermined time of 10 seconds, the control device 5 stops the rapid charge. While the rapid charge is stopped, the control device 5 samples the open circuit voltage (Voff) of the secondary battery 4. Then, in step No. 18, the control device 5 compares the sampled open circuit voltage (Voff) with the sampled voltage (Von) obtained in step No. 13 to provide a voltage difference (Vc).

The apparatus determines in step No. 19 whether the voltage difference (Vc) between the sampled open circuit voltage (Voff) obtained in step No. 17 and the sampled voltage (Von) obtained in step No. 13 is equal to or less than 40 mV.

When the voltage difference (Vc) is more than 40 mV, the process starts the rapid charge again, and goes back to step No. 5. Therefore, as long as the voltage difference (Vc) is be more than 40 mV, the process repeats between step No. 5 and step No. 19. In other words, the apparatus periodically samples the constant voltage (Von) and the open circuit voltage (Voff).

When the difference is equal to or less than 40 mV, the apparatus determines that the charging is complete, and the LED's No. 1, 2 and 3 are turned on, to indicate a fully charged state.

In step No. 21, the apparatus starts a timer Td which has a predetermined time period of one hour. When a determination is made in step No. 22 that the predetermined time period of one hour has elapsed, the LEDs No. 1, 2 and 3 are turned off in step No. 23, to indicate that it has taken enough time after the secondary battery 4 was fully charged and the charging is completed. The process is completed in step No. 24.

As mentioned above, in the first embodiment, the apparatus compares the voltage difference (Vc) between the open circuit voltage (Voff) and the charging constant voltage (Von) with a predetermined voltage difference value (for example, 40 mV). When the voltage difference (Vc) becomes equal to or less than the predetermined voltage difference value, the apparatus detects a full charge. It should be appreciated that other voltage difference values may be selected.

Figure 8:
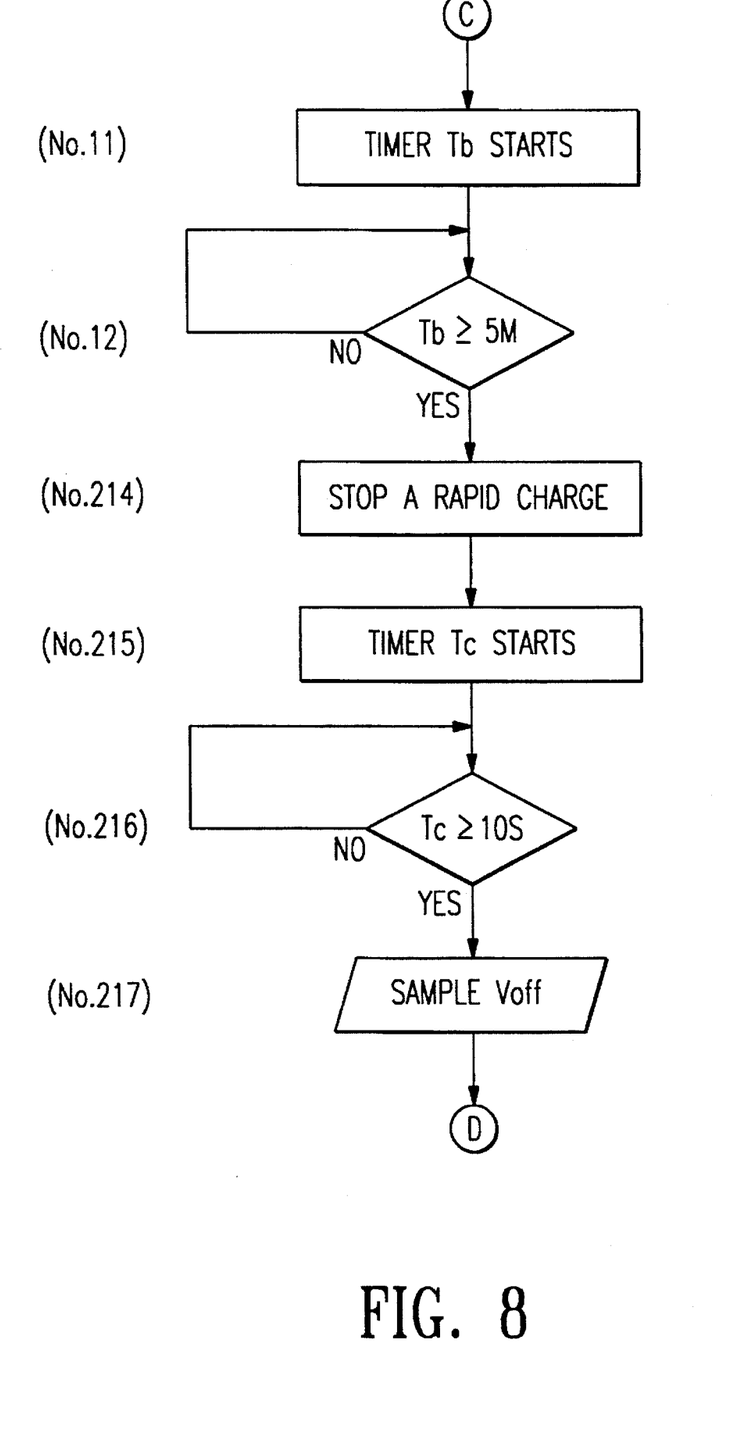
FIGS. 8 and 9 are flow charts showing a method of charging the secondary battery in accordance with a second embodiment of the present invention.
Figure 9:
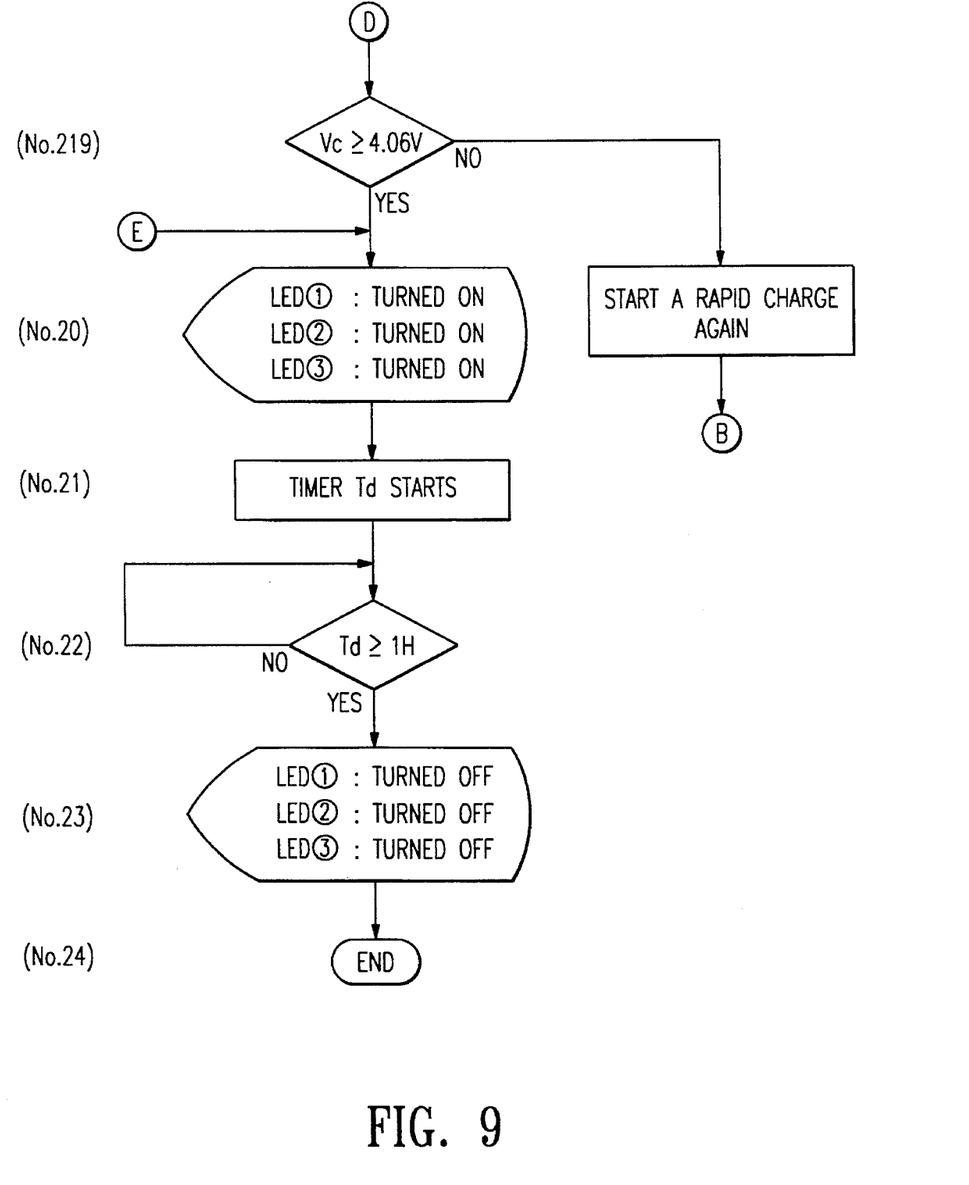

On the other hand, in the second embodiment which will be explained below, the apparatus compares the open circuit voltage (Voff) with a predetermined voltage value. When the open circuit voltage (Voff) becomes equal to or more than the predetermined voltage value, the apparatus detects a fully charged state. FIGS. 5, 8 and 9 show flow charts of the second embodiment.

The process of the second embodiment progresses in the same way as the first embodiment until step No. 12. The succeeding steps will be described below.

As shown in FIG. 8, the control device 5 stops the rapid charge, by turning off the switching element of the charging control section 2 in step No. 214, and starts a timer Tc which has a predetermined time period of 10 seconds in step No. 215. A determination is made in step No. 216 as to whether the condition of Tc≧10 seconds is met. Until the predetermined time period of 10 seconds has elapsed, the rapid charge is stopped by control means 5.

While the rapid charge is stopped, the control device 5 samples an open circuit voltage (Voff) of the secondary battery 4 in step No. 217. Then, in step No. 219, the control device 5 compares the sampled open circuit voltage (Voff) with a predetermined voltage value (for example, 4.06 V).

When the sampled open circuit voltage (Voff) is less than the predetermined reference voltage (4.06 V), the process restarts the rapid charge, and goes back to step No. 5. When the sampled open circuit voltage (Voff) is equal to or more than the predetermined voltage value (4.06 V), the process proceeds to next steps of No. 20–23 and is completed in step No. 24. It is noted that the same step numerals represent corresponding steps described in the first embodiment and the explanation concerning these corresponding steps is omitted.

As mentioned above, in the second embodiment, after the charging current becomes equal to or less than the predetermined current value, the apparatus compares the open circuit voltage (Voff) with a predetermined voltage value which is selected in accordance with the particular application. When the open circuit voltage (Voff) becomes equal to or more than the predetermined voltage value, the apparatus detects a fully charged state. In the second embodiment, it is not necessary to sample the terminal voltage (Von) as described in the first embodiment. As a consequence, the number of samplings of the voltage is be reduced.

As mentioned above, in both first and second embodiments, the apparatus periodically samples the open circuit voltage (Voff) or the constant voltage (Von), until the fully charged state is detected. On the other hand, in a third embodiment which will be discussed below, after the apparatus samples the open circuit voltage (Voff) for the first time, the remaining charge amount will be calculated, based on the sampled open circuit voltage (Voff). After charging for the timed remaining charging amount, the apparatus detects the full charge. Therefore, it is not necessary to periodically sample the open circuit voltage (Voff).

Figure 5:
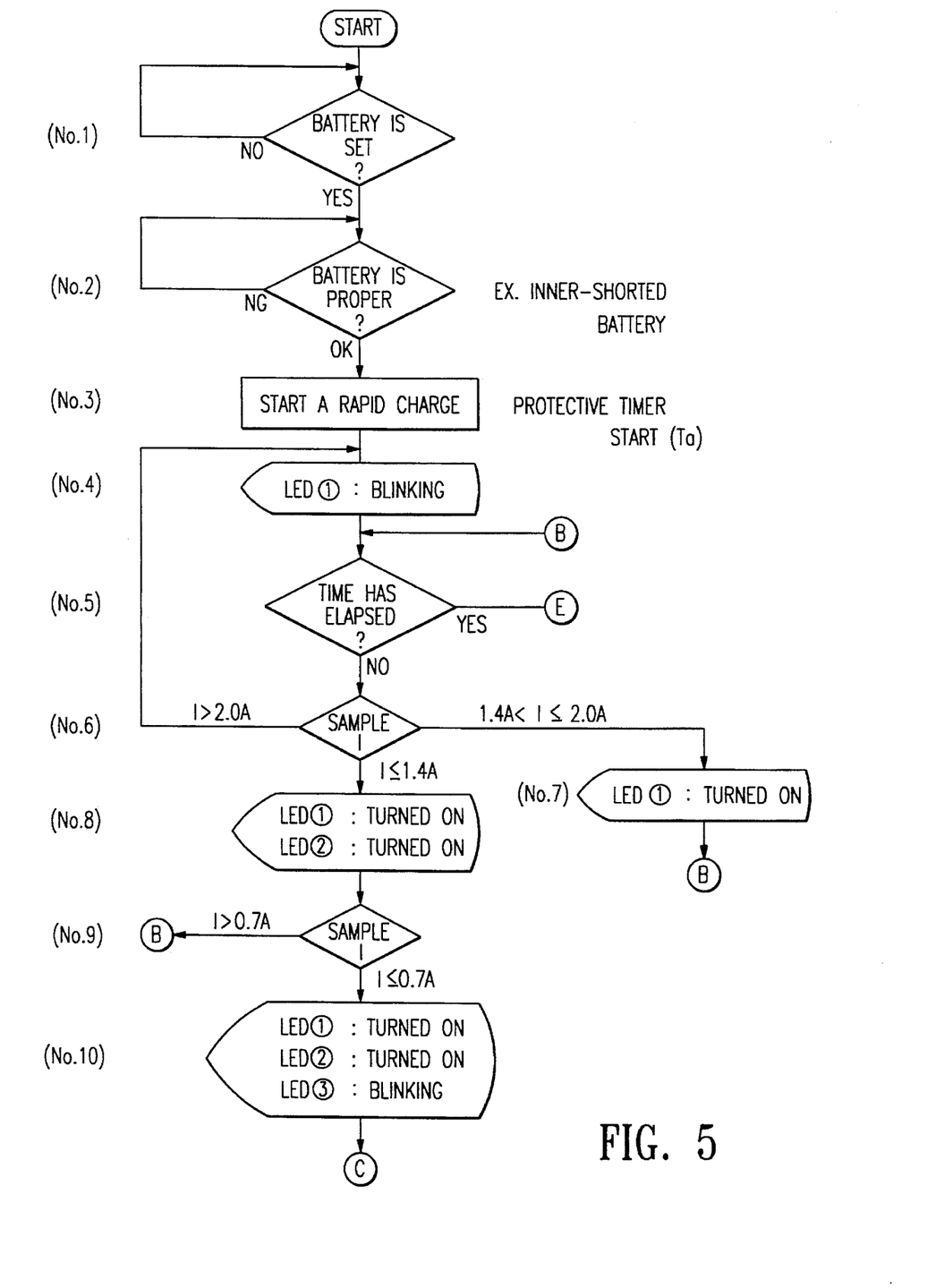
FIG. 5 is a flow chart showing a method of charging a secondary battery in accordance with an embodiment of the present invention.
Figure 10:
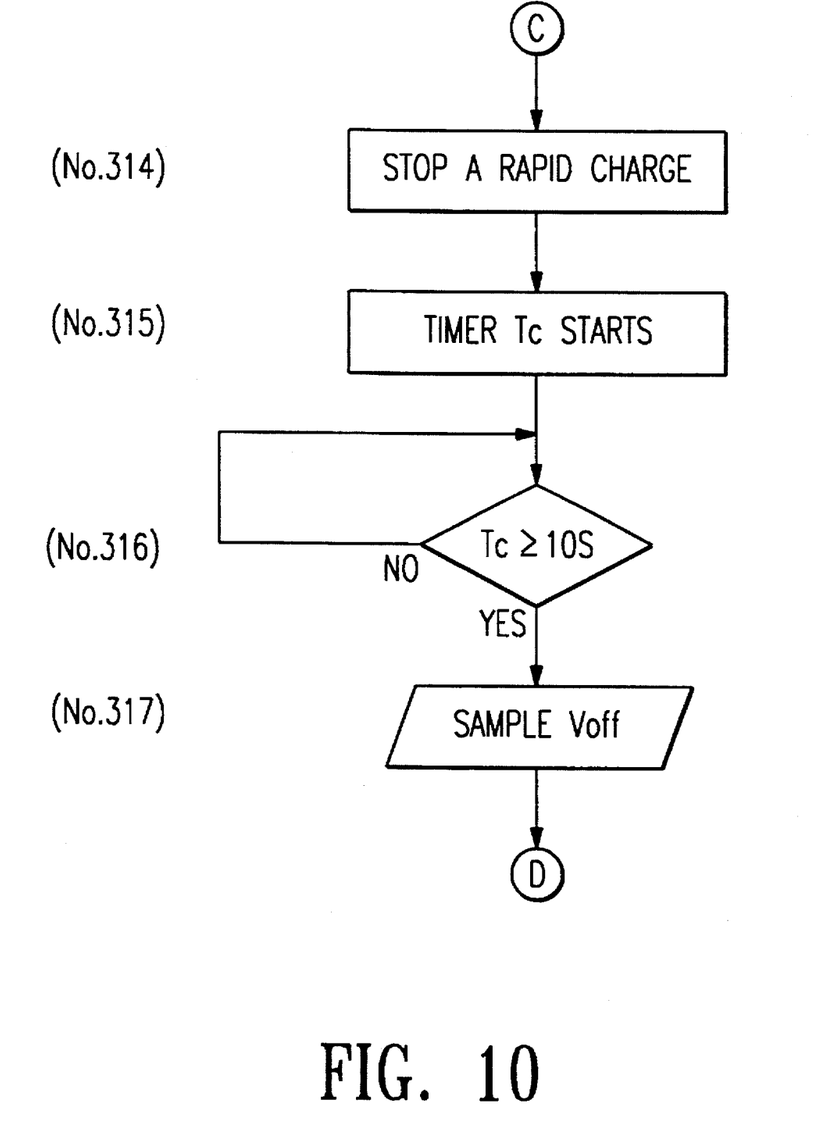
FIGS. 10 and 11 are flow charts showing a method of charging the secondary battery in accordance with a third embodiment of the present invention.
Figure 11:
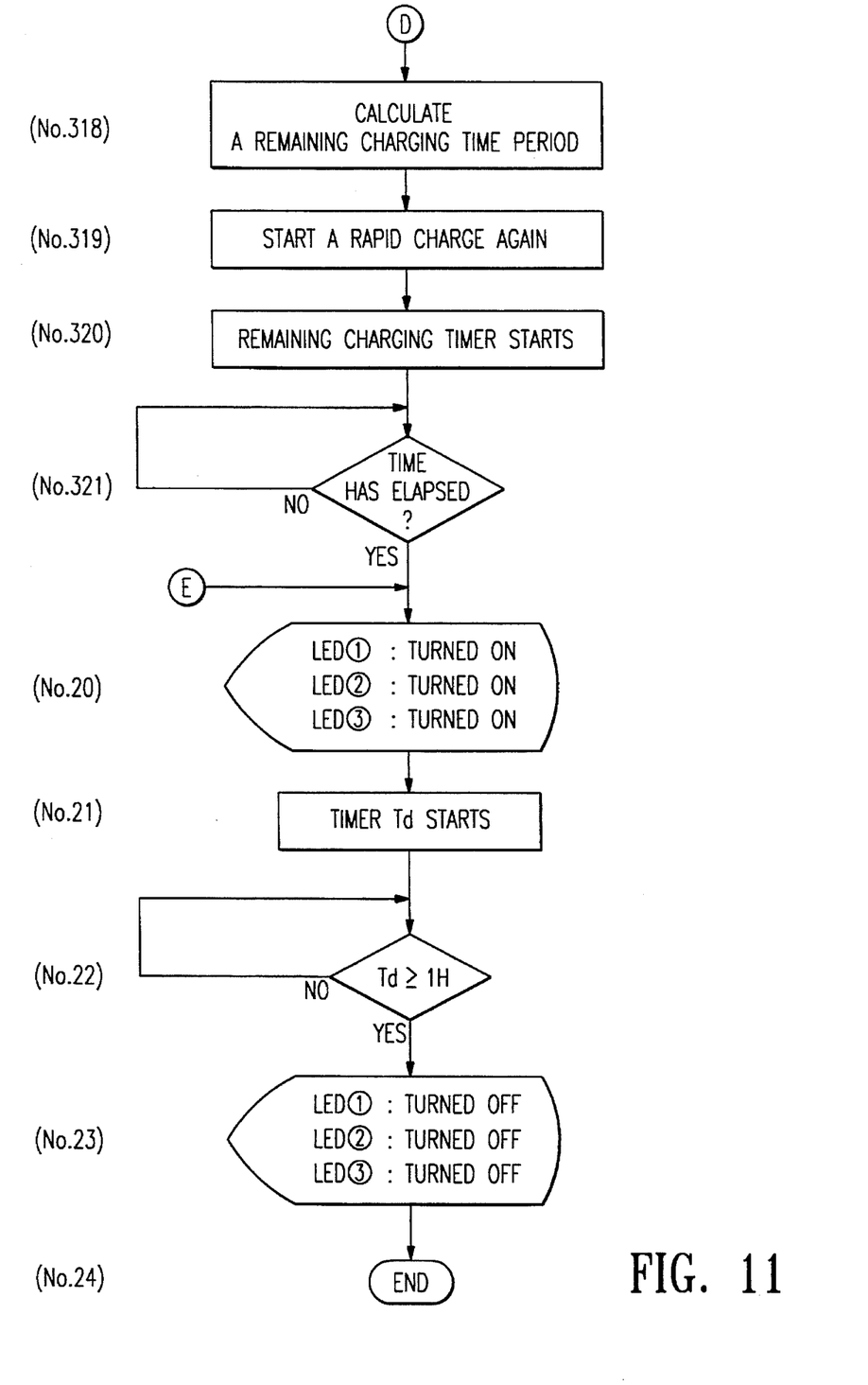

FIGS. 5, 10 and 11 are flow charts showing the method of charging according to the third embodiment. The process of the third embodiment progresses in the same way as the first embodiment until step No. 10. The succeeding process is discussed below in detail.

The control device 5 interrupts the rapid charge by turning off the switching element of the charging control section 2 in step No. 314, and stars a timer Tc which has a predetermined time period of 10 seconds in step No. 315. A determination is made in step No. 316 as to whether a condition of Tc≧10 seconds is met. Until the predetermined time period of 10 seconds has elapsed, the control device 5 continues to stop the rapid charge.

While stopping the rapid charge, the control device 5 samples the open circuit voltage (Voff) of the secondary battery 4 in step No. 317. Then, the apparatus calculates a remaining charging time period (Ts) to fully charge the battery based on the sampled open circuit voltage (Voff) in step No. 318. In one embodiment, the remaining charging time period (Ts) is calculated in the following manner. When the open circuit voltage (Voff) is high, the remaining charging time period (Ts) is set short, and when the open circuit voltage (Voff) is low, the remaining charging time period (Ts) is set long. For example, when the open circuit voltage (Voff) is less than 4.00 V, the remaining charging time period (Ts) is set to 30 minutes. When the open circuit voltage (Voff) is greater than or equal to 4.00 V and less than 4.06 V, the remaining charging time period (Ts) is set to 15 minutes. When the open circuit voltage (Voff) is greater than or equal to 4.06 V, the remaining charging time period (Ts) is set to 0 minutes, that is, the charging is terminated. The remaining charging time period (Ts) is inputted into a remaining charging timer which is provided inside the control device 5.

Right after the apparatus resumes the charge in step No. 319, the apparatus starts the remaining charging timer in step No. 320. After the remaining charging time period (Ts) has elapsed in step No. 321, the LED's No. 1, 2 and 3 are turned on, to indicate a full charge in step No. 20.

The process progresses into the next steps Nos. 21–24, to complete the process. It is noted that the same step numerals represent the corresponding steps described in the first embodiment and the explanation concerning these corresponding steps is omitted.

It will, of course, be understood that modifications of the present invention, in its various aspects will be apparent to those skilled in the art, some being apparent only after study and others being matters of routine electrical design. As such, the scope of the invention should not be limited by the particular embodiment herein described but should be defined only by the appended claims and equivalents thereof.

What is claimed:

1. A method of charging a secondary battery, comprising the steps of:

charging the secondary battery with a constant voltage, and generating a charging current;

maintaining charging of the secondary battery until detecting a first occurrence when the charging current becomes smaller than a predetermined current value;

substantially reducing charging of the secondary battery on a first occasion in response to detecting the first occurrence when the charging current becomes smaller than the predetermined current value;

sampling an open circuit voltage of the secondary battery while the charging is substantially reduced; and controlling charging according to the sampled open circuit voltage.

2. A method according to claim 1, further comprising the step of charging the secondary battery with a constant current, before charging the secondary battery with the constant voltage.

3. A method according to claim 1, wherein the step of charging the secondary battery includes:

sampling a terminal voltage of the secondary battery during charging the secondary battery; and wherein the step of controlling charging comprises:

comparing the voltage difference between the sampled open circuit voltage and the sampled terminal voltage with a predetermined voltage difference value; and completing charging when the voltage difference is smaller than the predetermined voltage difference value.

4. A method according to claim 1, wherein the step of controlling charging comprises:

comparing the sampled open circuit voltage with a predetermined voltage value; and completing charging when the sampled open circuit voltage is equal to or more than the predetermined voltage value.

5. A method according to claim 1, wherein the secondary battery is a nonaqueous, organic electrolyte, lithium secondary battery.

6. A method according to claim 1, wherein the secondary battery has charging characteristics in which the charging current generated by the constant voltage decreases as a function of time.

7. A method according to claim 1, wherein the step of substantially reducing charging results in the charging current being shut off.

8. A method of charging a secondary battery, comprising the steps of:

charging the secondary battery with a constant voltage to generate a charging current, the charging current decreasing as a function of time to a stable, low level of charging;

maintaining charging of the secondary battery until detecting a first occurrence when the charging current becomes smaller than a predetermined current value;

substantially reducing charging of the secondary battery on a first occasion in response to detecting the first occurrence when the charging current becomes smaller than the predetermined current value, the predetermined current value being higher than the stable, low level of charging current;

sampling an open circuit voltage of the secondary battery while the charging is substantially reduce; and controlling charging according to the sampled open circuit voltage.

9. A method according to claim 8, further comprising the step of charging the secondary battery with a constant current, before charging the secondary battery with the constant voltage.

10. A method according to claim 8, wherein the step of charging the secondary battery includes:

sampling a terminal voltage of the secondary battery during charging the secondary battery; and wherein the step of controlling charging comprises:

comparing the voltage difference between sampled open circuit voltage and the sampled terminal voltage with a predetermined voltage difference value; and completing charging when the voltage difference is smaller than the predetermined voltage difference value.

11. A method according to claim 8, wherein the step of controlling charging comprises:

comparing the sampled open circuit voltage with a predetermined voltage value; and completing charging when the sampled open circuit voltage is equal to or more the predetermined voltage value.

12. A method according to claim 8, wherein the secondary battery is effected to a nonaqueous, organic electrolyte, lithium secondary battery.

13. A method according to claim 8, wherein the step of substantially reducing charging results in the charging current being shut off.

14. A method of charging a secondary battery, comprising the steps of:

charging the secondary battery with a constant voltage, and generating a charging current;

substantially reducing charging, and sampling an open circuit voltage of the secondary battery, after detecting that the charging current becomes smaller than a predetermined current value; and controlling charging according to the sampled open circuit voltage, wherein the step of controlling charging includes:

calculating a remaining charging time period according to the sampled open circuit voltage; and completing charging after charging for the remaining charging time period.

15. A method of charging a secondary battery, comprising the steps of:

charging the secondary battery with a constant voltage to generate a charging current, the charging current decreasing as a function of time to a stable, low level of charging;

substantially reducing charging, and sampling an open circuit voltage of the secondary battery, after detecting that the charging current becomes smaller than a predetermined current value, the predetermined current value being higher than the stable, low level of charging current; and controlling charging according to the sampled open circuit voltage wherein the step of controlling charging comprises:

calculating a remaining charging time period according to the sampled open circuit voltage; and completing charging after charging for the remaining charging time period.

16. An apparatus for charging a secondary battery, the apparatus comprising:

charging means for charging the secondary battery with a charging current at a substantially constant voltage;

current detecting means responsive to the charging current for generating a signal after detecting a first occurrence when the charging current becomes smaller than a predetermined value;

controlling means responsive to the signal for substantially reducing the charging current, and wherein the controlling means maintains the charging until the first occurrence of when the charging current becomes smaller than the predetermined value; and sampling means for sampling an open circuit voltage of the secondary battery while reducing the charging current;

wherein the controlling means is responsive to the sampled open circuit voltage for controlling the charging current.

17. A method according to claim 16, wherein the step of substantially reducing charging results in the charging current being shut off.

* * * * *